United States Patent [19]

Toyoda et al.

[11] Patent Number: 4,969,795
[45] Date of Patent: Nov. 13, 1990

[54] INDUSTRIAL ROBOT EQUIPPED WITH A CABLE EXTENDING MEANS

[75] Inventors: Kenichi Toyoda, Hino; Nobutoshi Torii, Hachioji; Hitoshi Mizuno; Kyozi Iwasaki, both of Hino; Masano Miyawaki, Hachioji, all of Japan

[73] Assignee: Fanuc Ltd., Yamanashi, Japan

[21] Appl. No.: 246,822

[22] PCT Filed: Jan. 26, 1988

[86] PCT No.: PCT/JP88/00057
§ 371 Date: Sep. 9, 1988
§ 102(e) Date: Sep. 9, 1988

[87] PCT Pub. No.: WO88/05368
PCT Pub. Date: Jul. 28, 1988

[30] Foreign Application Priority Data
Jan. 26, 1987 [JP] Japan .................. 62-14086

[51] Int. Cl.$^5$ ............................................. B25J 19/00
[52] U.S. Cl. .................. 414/744.2; 414/918; 901/50
[58] Field of Search .............. 414/680, 918, 744.2, 414/744.8; 901/15, 27, 41-43, 49, 50; 248/65, 51, 52, 56, 68.1, 70, 81, 82, 84

[56] References Cited

U.S. PATENT DOCUMENTS

| 1,551,332 | 8/1925 | Schramm . | |
|---|---|---|---|
| 1,822,260 | 9/1931 | Adams . | |
| 2,826,440 | 3/1958 | Robboy | 287/91 |
| 3,322,886 | 5/1967 | Warshawsky | 174/86 |
| 3,593,952 | 7/1971 | Smith | 248/284 |
| 4,288,292 | 9/1981 | Hardin, Jr. et al. | 248/68.1 X |
| 4,378,959 | 4/1983 | Susnjara | 414/732 |
| 4,507,042 | 3/1985 | Suzuki et al. | 414/918 X |
| 4,542,279 | 9/1985 | Case, Jr. et al. | 901/42 X |
| 4,659,279 | 4/1987 | Akeel et al. | 414/680 |
| 4,700,017 | 10/1987 | Morand | 174/86 |
| 4,767,257 | 8/1988 | Kato | 414/918 X |
| 4,780,045 | 10/1988 | Akeel et al. | 901/50 X |

FOREIGN PATENT DOCUMENTS

| 2590337 | 11/1985 | France . | |
|---|---|---|---|
| 48-109668 | 12/1973 | Japan . | |
| 57-181596 | 11/1982 | Japan . | |
| 58-184293 | 12/1983 | Japan . | |
| 59-42893 | 3/1984 | Japan . | |
| 59-69893 | 5/1984 | Japan . | |
| 59-110591 | 6/1984 | Japan . | |
| 60-11788 | 1/1985 | Japan . | |
| 60-217092 | 10/1985 | Japan . | |
| 61-257789 | 11/1986 | Japan . | |
| 2134074 | 8/1984 | United Kingdom | 901/42 |
| 8703529 | 6/1987 | World Int. Prop. O. | 901/50 |
| 8707450 | 12/1987 | World Int. Prop. O. | 901/50 |

Primary Examiner—David A. Bucci
Assistant Examiner—William M. Heinz
Attorney, Agent, or Firm—Armstrong, Nikaido, Marmelstein, Kubovcik & Murray

[57] ABSTRACT

An industrial robot (10) comprising a cylindrical fixed robot body (14), a swivel body (26) mounted on the fixed robot body (14), a robot arm mechanism (60, 64) pivotally joined to the swivel body (26), and a robot wrist (66) connected to the robot arm mechanism is provided with a cable guide member (30). The cable guide member (30) is extended along the outside of the fixed robot body (14) and has a lower end pivotally joined to the fixed robot body (14) by a lower bearing member (42) and an upper end pivotally joined to the swivel body (26) by an upper bearing member (40). The cables (50) of the industrial robot (10) extending from the lower end of the fixed robot body (14) are held by cable holding section (32) formed in the middle portion of the cable guide member (30) and are extended from the upper end of the cable holding member (30) through the swivel body (26) toward the robot arm mechanism.

4 Claims, 3 Drawing Sheets

INDUSTRIAL ROBOT EQUIPPED WITH A CABLE EXTENDING MEANS

TECHNICAL FIELD

The present invention relates to a cable extending means for an industrial robot and, more specifically, to an industrial robot equipped with a cable extending means comprising a cable guide member for protectively holding a plurality of cables extending from the lower end of the cylindrical fixed body of the industrial robot through swivel robot components toward the robot arm mechanism of the industrial robot, capable of protecting and extending the lifetime of the cables by suppressing the swing motion of the cables, resulting from the swivel motion of the swivel robot components, to the least possible extent.

BACKGROUND ART

The multiaxial articulated robot, among various industrial robots, comprises structural components including a fixed body serving as a supporting structure, a swivel body mounted on the fixed body for swivel motion, and a robot arm mechanism including a robot arm, a robot wrist, a robot hand, and end effectors such as welding tools, and pivotally joined to the swivel body. In most cases, electric motors are used as drive motors for driving the structural components for swivel motion or swing motion. Accordingly, cables must be extended internally and externally of the robot assembly to supply power through a robot controller to the drive motors of the multiaxial articulated robot and to exchange control signals between the robot controller and detectors for positioning control. To extend the cables for such purposes, cable extending means have been proposed, but rubbing, twisting or bending of the cables when the swivel body and the robot arm mechanism are driven for swivel motion or swing motion damages the cable sheaths and may possibly break the conductors of the cables. Therefore, it is a necessary structural condition that the cable extending means are capable of preventing this rubbing, twisting and bending of the cables.

Accordingly, the cable extending means which have hitherto been proposed and provided are designed to guide the cables properly according to the intrinsic structure and mode of operation of the associated industrial robots. Nevertheless, it is difficult to provide a cable extending means universally applicable to various industrial robots; particularly, a cable extending means for a multiaxial articulated robot having a construction simplified to the utmost degree and designed for manufacture at a reduced cost must have a simple construction and must be manufactured at a reduced cost.

DISCLOSURE OF THE INVENTION

Accordingly, an object of the present invention is to provide a cable extending means for an industrial robot, capable of meeting the foregoing requisite conditions.

Another object of the present invention is to provide a multiaxial articulated industrial robot incorporating a cable extending means.

The present invention provides an industrial robot comprising: a cylindrical fixed robot body; a swivel body mounted on the cylindrical fixed robot body; a robot arm mechanism pivotally joined to the swivel body; and cable extending means for collectively and protectively guiding cables extended from the lower end of the cylindrical fixed robot body toward the robot arm mechanism; wherein the cable extending means has a cable guide means extended vertically along and outside the cylindrical fixed robot body and having an upper end pivotally joined to the swivel body on the axis of swivel motion of the swivel body by an upper bearing member, and a lower end pivotally joined to the cylindrical fixed robot body on the axis of swivel motion of the swivel body by a lower bearing member. The cable extending means protectively holds cables extending from the lower end of the cylindrical fixed robot body through the central hole of the lower bearing member and guides the cables so that the cables extend from the upper end of the cable guide means through a cable clamping position on the swivel body. The cable guide means is constructed so as to be disposed outside the robot structure, to simplify the construction and to reduce costs.

BRIEF DESCRIPTION OF THE DRAWINGS

The above and other objects, features and advantages of the present invention will become more apparent from the following description taken in conjunction with the accompanying drawings, wherein.

BEST MODE OF CARRYING OUT THE INVENTION

Figure 1:
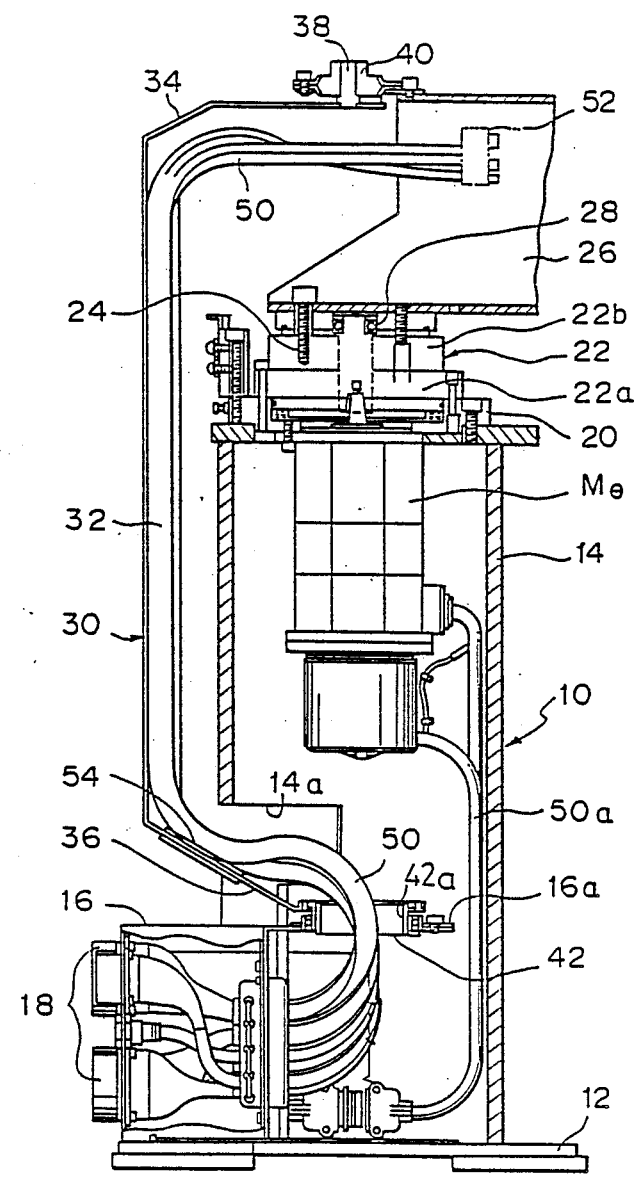
FIG. 1 is a longitudinal sectional view showing the arrangement of a cable extending means for an industrial robot, according to the present invention.

Referring to FIG. 1, an industrial robot 10, in a preferred embodiment, according to the present invention embodied in a multiaxial articulated robot having a comparatively simple construction, is a stationary robot placed on the floor and having a fixed base plate 12 and a cylindrical fixed robot body 14 standing upright on the base plate 12. The fixed robot body 14 is a hollow structure fixed to the base plate 12 by a suitable fixing means such as welding or bolts. A connector box 16 for electrically or mechanically connecting cables is fixedly attached to the lower end of the robot body 14, and a suitable number of cable connectors 18 (two cable connectors in this embodiment) are provided on the connector box 16. Cable connectors, not shown, of external cables extending from a robot controller or the like are connected to the cable connectors 18. The connector box 16 itself is an inexpensive container formed as a box-shaped structural member by bending a metallic plate.

A flange plate 20 is attached to the upper end of the fixed robot body 14, and a drive motor $M\theta$ is fixed to and suspended from the flange plate 20 within the internal space of the fixed robot body 14; the output shaft of the drive motor $M\theta$ projecting upward from the flange plate 20. The output shaft of the drive motor $M\theta$ is connected to the input unit 22a of a universally known reduction gear 22 having a high reduction ratio (for example, a universally known "Harmonic Drive ®"). The reduction gear 22 transmits the output torque of the drive motor $M\theta$ to a swivel body 26 fixedly connected to the output unit 22b of the reduction gear 22 by a suitable fixing means 24 such as bolts, after reducing the input speed to a lower output speed. In this embodiment, the output unit 22b of the reduction gear 22 and the swivel body 26 turn on a bearing 28. A robot arm mechanism, which will be described afterward, is joined pivotally to the extremity of the swivel body 26 by a pivotal joining structure for swing motion about a horizontal axis substantially perpendicular to the axis of swivel motion of the swivel body 26. In FIG. 1, the extremity of the swivel body 26 is broken away and is not shown.

A cable guide member 30 is extended outside the robot body 14. The cable guide member 30 is an individual member extended longitudinally outside the robot body 14 and having a longitudinally extended cable holding section 32 as a principal structural portion for protectively holding cables 50. The cable holding section 32 is formed in a substantially U-shaped cross section to hold the cables 50 therein. Naturally, the cables 50 are fastened to the cable holding section 32 of the cable guide member 30 with suitable tie bands and straps for collectively holding cables. An upper lateral arm 34 and a lower lateral arm 36 are formed integrally with the cable holding section 32 respectively at the upper and lower ends of the cable holding section 32 to extend respectively via inclined portions. The upper lateral arm 34 is extended so that the extremity thereof is positioned close to the swivel body 26 and is provided at the free end thereof with a pivot 38. The pivot 38 is fixed by a suitable fixing method such as welding or bolting, and is fitted in an upper bearing member 40 held on one end of the swivel body 26 coaxially with the axis of swivel motion of the swivel body 26. The pivot 38 and the bearing member 40 constitute a pivotal structure.

On the other hand, the lower lateral arm 36 extends through an opening 14a formed in the lower part of the fixed robot body 14 into the interior space of the fixed robot body 14 and is joined pivotally to the tongue 16a of the connector box 16 by a pivotal structure including a lower bearing member 42 disposed coaxially with the axis of the swivel motion of the swivel body 26. The lower bearing member 42 has a central throughhole 42a for receiving the cables 50 therethrough so that the cables 50 extend upward. Bearings having a flanged outer ring and available on the market may be employed as the upper bearing member 40 and the lower bearing member 42, to construct the pivotal structures for pivotally holding the cable guide member 30, at a low cost.

The cable guide member 30 is a lightweight, inexpensive structural component of the robot, formed by bending a blank cut from a single metallic plate, which will be described afterward, and is joined to the fixed robot body 14 for swivel motion outside the fixed robot body 14. The cables 50 to be held by the cable guide member 30 start from the cable connectors 18, extend through the throughhole 42a of the lower bearing member 42, rise longitudinally along the lower lateral arm 36 of the cable guide member 30 and the U-shaped channel of the cable holding section 32, extend laterally from the upper end of the cable holding section 32, are fastened to the swivel body 26 at a clamping point 52 of the swivel body 26, and then extend further from the clamping point 52 toward the robot arm mechanism. The cable 50a having wires for supplying power and those for transmitting the output signals of a swivel angle detector, connected to the drive motor Mθ for driving the swivel body 26, is not related to the swivel motion of the robot, and thus the cable 50a is extended fixedly within the interior space of the fixed robot body 14 without the need for any particular consideration.

Figure 2:
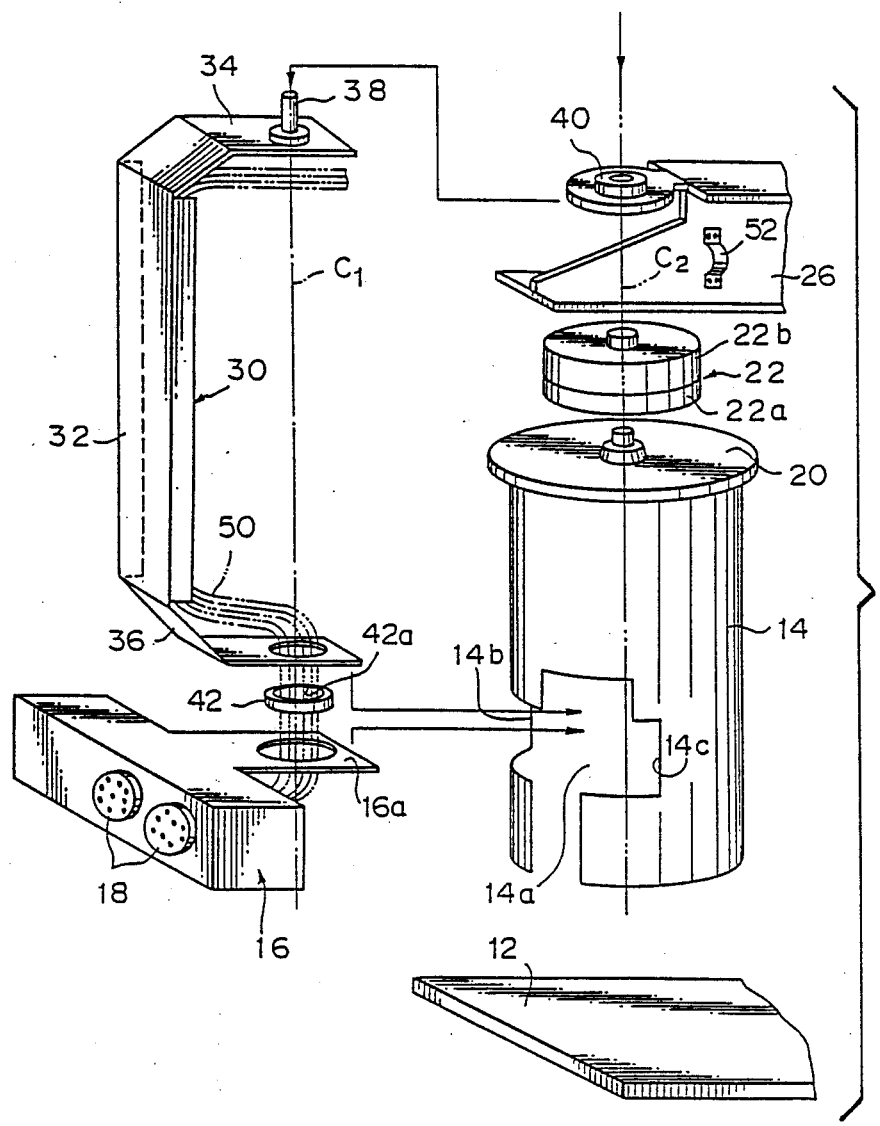
FIG. 2 is an exploded perspective view concretely showing the construction of the cable conduit means shown in FIG. 1.

The manner of extension and arrangement of the cables 50 by the cable guide member 30 relative to the robot assembly can be concretely understood from FIG. 2, which shows the three-dimensional constitution of the cable extending means for the industrial robot embodying the present invention. Furthermore, the connection of the fixed robot body 14 and the swivel body 26, and the manner of extending the cable guide member 30 through the opening 14a of the fixed robot body 14 into the interior space of the fixed robot body 14 also can be clearly understood from FIG. 2. As is obvious from FIG. 2, the axis $C_1$ of swivel motion of the cable guide member 30 is in alignment with the axis $C_2$ of swivel motion of the swivel body 26.

The functions of the cable extending means for the industrial robot of the present invention will be described hereinafter. The cables 50 pass through the central throughhole 42a of the lower bearing member 42 pivotally supporting the lower lateral arm 36 of the cable guide member 30, extend along the cable holding section 32, and then extend from the upper end of the cable holding section 32 toward the swivel body 26, so that the cable guide member 30 is caused to swivel by the bridging action of the cables 50 as the swivel body 26 is driven for swivel motion by the drive motor Mθ. But, since the starting portions of the cables 50 extend longitudinally along the axis of swivel motion of the swivel body 26 through the throughhole 42a of the lower bearing member 42, the starting portions of the cables 50 each turn on a circle of a minimum radium when the cable guide member 30 is made to swivel. Consequently, the swivel motion of the starting portions of the cables 50 within the interior space of the fixed robot body 14, each on a circle of a large radius, can be avoided, and thus a minimum external force, such as a tensile force and a bending force, is exerted on the starting portions of the cables 50. Therefore, the possibility of trouble with the cables 50, such as damage to the sheaths of the cables 50 and breakage of the conductors of the cables 50, attributable to an external force exerted on the cables 50, is remarkably reduced. The swivel motion of the cable guide member 30 in opposite directions in a horizontal plane is limited by edges 14b and 14c defining the side ends of the opening 14a of the fixed robot body 14. Therefore, the angular range of swivel motion of the cable guide member 30 can be limited to less than the angular range of swivel motion of the swivel body 26, by previously adjusting the position of the edges 14b and 14c defining the lateral size of the opening 14a to limit the torsional strain of the starting portions of the cables 50 caused by the swivel motion of the cable guide member 30. Naturally, portions of the cables 50 near the clamping point 52 on the swivel body 26 are bent when the cable guide member 30 is swiveled. Therefore, the cables are arranged so that a minimum possible external force is distributed uniformly at the starting portions and portions near the clamping point 52 of the cables 50, to properly protect the cables 50 and to extend the lifetime of the cables 50. Preferably, a protective seat 54 is provided on the lower lateral arm 36 of the cable guide member 30, to cover an area whereat the cables 50 are in contact with the lower lateral arm 36, and thus protect the sheaths of the cables 50.

As is obvious from the foregoing description made with reference to an example of the cable extending means for the industrial robot embodying the present invention, according to the present invention, the cable extending means holds portions of the cables extending outside the body of the multiaxial articulated robot by the cable guide member formed simply through sheet metal working, so that a minimum external force, such as tensile force and torsional force, will be exerted on the cables when the swivel body of the robot is swiveled, and thus the cables placed on the robot assembly are protected from damage and the life-time of the cables is extended. Furthermore, including the cable guide member having a comparatively simple construction, the cable extending means has a simple construction and a low cost.

Figure 3:
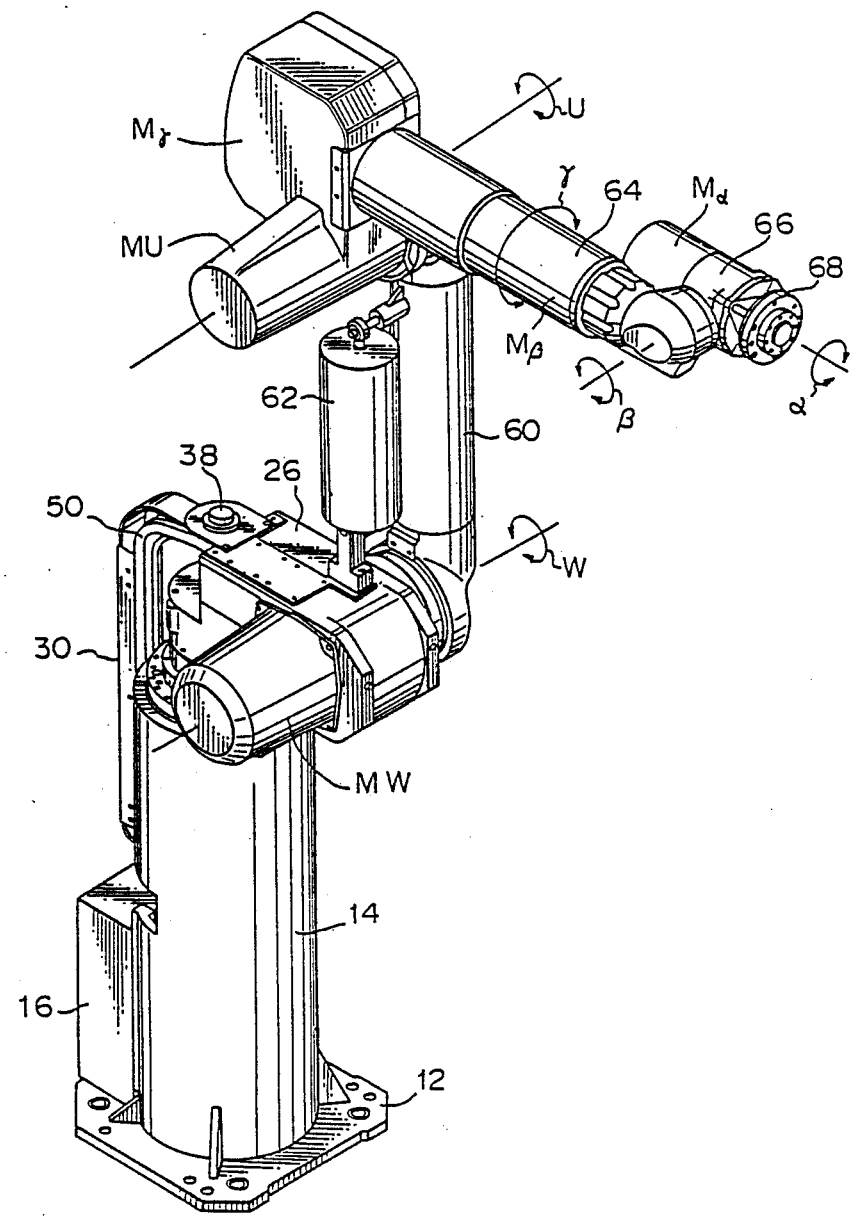
FIG. 3 is a perspective view of a multiaxial articulated robot incorporating the cable extending means shown in FIGS. 1 and 2.

FIG. 3 shows the general constitution of a multiaxial articulated robot, by way of example, provided with the cable extending means shown in FIGS. 1 and 2.

Referring to FIG. 3, the first robot arm 60 of the robot arm mechanism of the multiaxial articulated robot is joined to the extremity of the swivel body 26 to be driven in a turning motion about an axis W by a drive motor MW. A shock-absorbing balancer 62 is provided beside the first robot arm 60. The second robot arm 64 of the robot arm mechanism is joined pivotally to the extremity of the first robot arm 60. The second robot arm 64 is driven in a turning motion about an axis U by a drive motor MU. A robot wrist 66 is joined to the extremity of the second robot arm 66. An end effector, not shown, such as a robot hand, is joined to a coupling flange 68 attached to the extremity of the robot wrist 66. The robot wrist 66 is driven for rotation about an axis $\alpha$ by a wrist motor M$\alpha$, and for rotation about an axis $\beta$ by a wrist motor M$\beta$. The robot wrist 66 is driven for revolution about an axis $\gamma$ by a wrist motor M$\gamma$ provided on the rear end of the second robot arm 64.

LIST OF REFERENCE NUMERALS AND CHARACTERS

10 ... Robot
12 ... Fixed plate
14 ... Cylindrical fixed robot body
14$a$ ... Opening
14$b$, 14$c$ ... Edges
16 ... Connector box
16$a$ ... Tongue
18 ... Cable connector
20 ... Flange plate
22 ... Reduction gear
22$a$ ... Input unit
22$b$ ... Output unit
24 ... Fixing means
26 ... Swivel body
28 ... Bearing
30 ... Cable guide member
32 ... Cable holding section
34 ... Upper lateral arm
36 ... Lower lateral arm
38 ... Pivot
40 ... Upper bearing member
42 ... Lower bearing member
42$a$ ... Central throughhole
50 ... Cable
50$a$ ... Cable
52 ... Clamping point
54 ... Protective seat
60 ... First robot arm
62 ... Shock-absorbing balancer
64 ... Second robot arm
66 ... Robot wrist
68 ... Coupling flange
M$\theta$ ... Drive motor
MU ... Drive motor
MW ... Drive motor
M$\alpha$ ... Wrist motor
M$\beta$ ... Wrist motor
M$\gamma$ ... Wrist motor
$C_1$, $C_2$ ... Axes of swivel motion
U, W, $\alpha$, $\beta$, $\gamma$ ... Axes of turning motion

We claim:

1. An industrial robot comprising:
a base;
a cylindrical fixed robot body fixed to the base and having a lower end and an interior space adapted for accommodating a drive source for a swivel body;
the swivel body mounted on the fixed robot body, and capable of swivelling about a first axis of swivel motion;
a robot arm mechanism pivotally joined to the swivel body;
a cable extending means for collectively holding cables extended from the lower end of the fixed robot body toward the robot arm mechanism, said cable extending means including:
cable guide means placed longitudinally along and outside the fixed robot body,
an upper bearing member pivotally supporting said cable guide means on one end on the first axis of swivel motion of the swivel body, and
a lower bearing member pivotally supporting said cable guide means on a second end on the first axis of swivel motion of the swivel body,
said cable guide means holding the cables, said cables having a starting point at the lower end of the cylindrical fixed robot body and passing through a central throughhole in the lower bearing member, and said cables extending from the upper end of the cable guide means via a cable clamping point provided on the swivel body; and
a connector box attached to the lower end of said fixed robot body, said cables being connected electrically at said starting point to connectors provided on the connector box, said connector box being adapted to support the lowering bearing member supporting the cable guide means and to securely clamp said cables so as to maintain electrical connection between the cables and the connectors.

2. An industrial robot according to claim 1, wherein the cable guide means of said cable extending means further comprises:
a cable holding section having a U-shaped cross section and extending longitudinally along and outside said fixed robot body; and
arm sections extending respectively from upper and lower ends of the cable holding section, and
said cable guide means being an integral member formed by bending a metallic plate.

3. An industrial robot according to the claim 2, wherein
the lower end of said cable guide means has a tongue extending through an opening formed in the fixed robot body into the interior space of the fixed robot body, and
the cable guide means is jointed pivotally to said lower bearing member at the end of the tongue.

4. An industrial robot according to claim 3, wherein an angular range of swivel motion of said cable guide means is defined by the opening formed in said fixed robot body.

* * * * *

UNITED STATES PATENT AND TRADEMARK OFFICE
CERTIFICATE OF CORRECTION

PATENT NO. : 4,969,795

DATED : November 13, 1990

INVENTOR(S) : TOYODA et al

It is certified that error appears in the above-identified patent and that said Letters Patent is hereby corrected as shown below:

On the title page, Item [75], lines 3 and 4, "Masano Miyawaki," should read --Masanao Miyawaki,--.

Signed and Sealed this

Eighth Day of September, 1992

Attest:

DOUGLAS B. COMER

*Attesting Officer*　　　*Acting Commissioner of Patents and Trademarks*